US008270651B2

(12) United States Patent
McCarty et al.

(10) Patent No.: US 8,270,651 B2
(45) Date of Patent: Sep. 18, 2012

(54) SYSTEM AND METHOD FOR MOUNTING OF AUDIO-VISUAL COMPONENTS

(75) Inventors: William A. McCarty, San Diego, CA (US); Jeff W. King, San Diego, CA (US)

(73) Assignee: KSC Industries, Inc., Chula Vista, CA (US)

( * ) Notice: Subject to any disclaimer, the term of this patent is extended or adjusted under 35 U.S.C. 154(b) by 1386 days.

(21) Appl. No.: 10/786,576

(22) Filed: Feb. 24, 2004

(65) Prior Publication Data

US 2005/0185801 A1    Aug. 25, 2005

(51) Int. Cl.
    *H04R 1/02* (2006.01)
(52) U.S. Cl. .......... 381/333; 381/87; 381/386; 381/361; 381/388; 181/150; 181/171; 181/179
(58) Field of Classification Search .................... 381/87, 381/152, 306, 385–386, 361, 333, 336, 388, 381/81; 181/148, 144, 150, 151, 153, 171, 181/179
    See application file for complete search history.

(56) References Cited

U.S. PATENT DOCUMENTS

| 4,475,226 | A  | * | 10/1984 | Greenberg ..................... 381/300 |
| 5,000,286 | A  |   | 3/1991  | Crawford et al. |
| 5,299,766 | A  | * | 4/1994  | Curtis et al. ................. 248/27.1 |
| 5,675,426 | A  | * | 10/1997 | Meisner et al. ............... 348/838 |
| 5,732,140 | A  | * | 3/1998  | Thayer .......................... 381/300 |
| 5,737,123 | A  | * | 4/1998  | Donohoe ....................... 359/450 |
| 5,818,942 | A  | * | 10/1998 | Freadman ..................... 381/300 |
| 5,900,715 | A  | * | 5/1999  | Roberts ......................... 320/115 |
| 6,151,401 | A  | * | 11/2000 | Annaratone ................... 381/388 |
| 6,298,942 | B1 | * | 10/2001 | Schlatmann et al. ......... 181/144 |
| 6,449,146 | B1 | * | 9/2002  | Ryuuzaki ...................... 361/683 |
| 6,721,430 | B2 | * | 4/2004  | Wang ............................ 381/334 |
| 6,721,434 | B2 | * | 4/2004  | Polk et al. .................... 381/388 |
| 6,918,461 | B2 | * | 7/2005  | Christie ........................ 181/148 |
| 6,925,188 | B1 | * | 8/2005  | Markow et al. .............. 381/306 |
| 7,034,902 | B2 | * | 4/2006  | Tajima .......................... 348/836 |
| 2001/0027560 | A1 | * | 10/2001 | Simon ............................. 725/1 |
| 2003/0029975 | A1 | * | 2/2003 | Cowan et al. .............. 248/220.1 |
| 2003/0123679 | A1 | * | 7/2003 | Dudleston et al. .............. 381/87 |
| 2004/0045224 | A1 | * | 3/2004 | Chesser et al. .................... 52/29 |
| 2005/0047616 | A1 | * | 3/2005 | Lee ............................... 381/152 |

* cited by examiner

Primary Examiner — Davetta W Goins
Assistant Examiner — Disler Paul
(74) Attorney, Agent, or Firm — Knobbe Martens Olson & Bear LLP

(57) ABSTRACT

A system and method for mounting modular audio-visual components on a surface such as a wall. In particular, a modular mounting bar may comprise at least one audio-visual module which may be affixed to a rail configured to be attached to a wall at a plurality of locations along the rail and configured to receive a module at a plurality of locations along the rail. A cover or grille may be configured to be attached in front of the modules.

48 Claims, 13 Drawing Sheets

SYSTEM AND METHOD FOR MOUNTING OF AUDIO-VISUAL COMPONENTS

BACKGROUND OF THE INVENTION

1. Field of the Invention

This invention generally relates to systems and apparatus for mounting audio-visual components on a wall. In particular, the invention relates to a system and apparatus for mounting a set of audio loudspeakers in proximity to a flat panel video display.

2. Description of the Related Art

An entertainment system typically includes a video display. Recently, large, flat panel, video displays have become increasingly popular due to falling prices of these devices. Much of the popularity of flat panel displays is due to the relatively thin form factor that these displays have when compared to traditional cathode ray tube (CRT) and rear projection video displays. One particular advantage of these displays is that, due to their relative thinness, these devices are easily mounted on a wall. This also has the advantage of dispensing with the need for the bulky storage cabinet that is often employed to hold a traditional video display device.

However, as a corollary to the use of flat panel screen technology, such as a plasma or liquid-crystal display (LCD) screen, to reduce the size of a display, the housing of the display may no longer have room for loudspeakers to reproduce the audio component of audio-video signal. Thus many flat panel displays do not include loudspeakers. Other displays include only small, usually lower quality, loudspeakers that are not adequate to accurately reproduce the sound that is typically provided. Further, even when adequate left and right channel loudspeakers are provided by a display, a third center channel speaker is often not included. A center channel is required to fully take advantage of the 6 or more channels provided by audio systems such as Dolby Digital or DTS. However, center channel speakers are typically placed on top of the display, which is not always possible or desirable with a relatively thin, wall-mounted display.

Placement of a set of speakers on one or more stands on the floor near the display is one solution to the problem of providing a set of speakers for a flat panel display. However, this clutters the area around the display and tends to frustrate the purpose for wall-mounting the display.

Another solution is to mount speakers into the wall, either using special purpose speakers, or in niches in the wall. However, this is not always feasible due to constraints in the construction of the wall. In-wall mounting also may not be cost effective except in new construction. Further, a landlord may not allow a tenant to make the necessary wall openings.

Wall mounted speakers are another solution. However, existing speaker mounts are typically nothing more than wall mounted shelves or brackets, one for each speaker, which are not typically configured specifically for a wall-mounted display. Thus, a need exists for more convenient mounting systems for audio-visual components such as loudspeakers.

The term "audio-visual component" generally refers to any electronic device capable of receiving, producing, or processing an audio signal, a video signal, or a signal comprising both audio and video signals. The term "audio-visual signal" generally refers to analog or digital signals which represent audio data, video data, or both.

As noted above, the use of a set of individual wall-mounted speakers tends to result in more clutter of the sort that flat panel displays are intended to relieve. Moreover, when attempting to install three or more individually mounted speakers on the wall holding the flat panel display, the installer may have difficulty placing three separate speaker mounts on the wall in a desirable configuration due to the need to install each speaker mount into a stud in the wall. Finally, consumers must purchase, not only the display, but also a set of speakers, and compatible wall mounts, frequently from separate vendors, which may discourage many consumers from making any purchase at all.

Furthermore, as also noted above, wall mounting of the display removes the need for a cabinet to hold the display. However, display cabinets are typically used for more than holding the display. In particular, display cabinets may comprise additional shelves to hold additional audio-video equipment such as VCRs, DVD players, or loudspeakers. Thus, the need for a convenient place to store related audio-visual components grows.

SUMMARY OF THE INVENTION

The system, method, and devices of the invention each have several aspects, no single one of which is solely responsible for its desirable attributes. Without limiting the scope of this invention as expressed by the claims, which follow, its more prominent features will now be discussed briefly. After considering this discussion, and particularly after reading the section entitled "Detailed Description of the Embodiments of the Invention" one will understand how the features of this invention provide advantages that include increased ease of wall mounting the components of an audio-visual system.

One embodiment is a modular mounting bar for securing components to a surface. The system comprises a plurality of audio-visual modules. A rail is configured to be attached to the surface at one of a plurality of locations along the rail. The rail is also configured to receive a module at one of a plurality of locations along the rail. A cover may be configured to be secured in front of at least a portion of one of the modules.

Another embodiment is a modular mounting system for audio-visual components. The system comprises at least one audio-visual module. A rail may be configured to be attached to a surface, and may be configured to receive the module.

Another embodiment is a method of mounting audio-visual components to a surface. A rail is provided which has portions thereof that define a channel. The rail is secured to the surface. At least one audio-visual component is provided which has attachment surfaces that matingly connect with the channel. The component is secured to the rail, so as to fix the component in a desired location on the rail.

Yet another embodiment is a method of mounting audio-visual components to a surface. A first rail is provided. The first rail is secured to the surface. An audio-visual component is connected to the first rail. In one embodiment, a second rail may be provided. The second rail is secured to the first rail to define an extended rail. At least one audio-visual component is connected to the second rail.

One embodiment is an assembly for mounting audio-visual components for use with a wall-mounted display. The assembly may comprise at least two audio-visual modules comprising loudspeakers. A rail is configured to be attached to a surface and is configured to receive the module. A cover may have a dimension approximately equal to a length of the display and define a mating relationship with the at least two modules.

Another embodiment is a modular mounting bar for securing components to a surface. The bar comprises a means for providing a first rail, a means for securing the first rail to the surface, and a means for connecting an audio-visual component to the first rail.

DETAILED DESCRIPTION OF THE EMBODIMENTS OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

Figure 1:
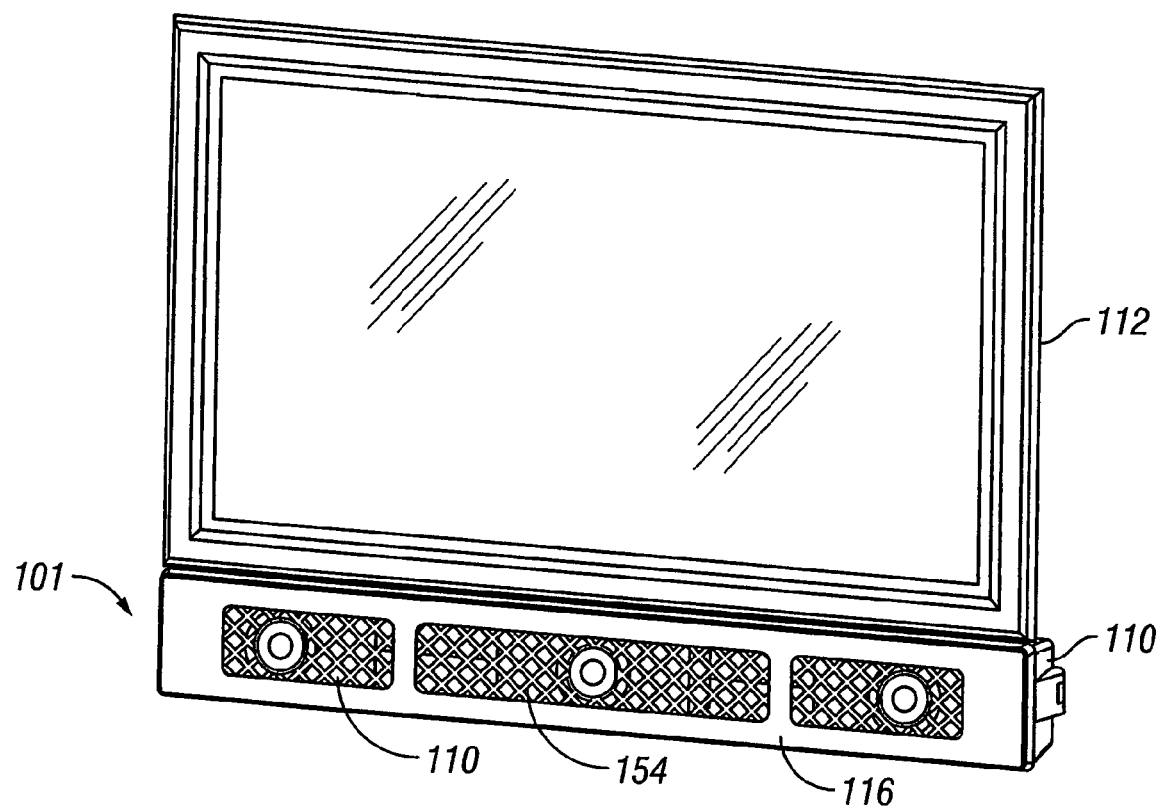
FIG. 1 depicts a front perspective view of one embodiment of a modular mounting bar used in connection with a flat panel display.

As depicted in FIG. 1, one embodiment of the invention is a modular mounting bar 101 for conveniently mounting audio-visual modules 110 in proximity to a wall mounted video display 112. Each audio-visual module 110 preferably contains one or more audio-visual components. An audio-visual component may be any electronic component. These include any electronic component for producing, amplifying, or reproducing an audio-video signal, for example, a loudspeaker, a DVD player, a media center, a computer, an MP3 player, a central processing unit (CPU), an audio-visual signal distribution system, or a CD player. A cover 116 may be attached in front of the modules 110. In the embodiments of FIGS. 1 and 2A-C, the three modules house respectively the speakers for the left front, center, and right front channels of the well known multi-channel surround sound systems. A cover 116 may comprise a grille, a screen, or an opaque material.

Preferably, the modules 110 are configured to be used with a wall-mounted display 112. More preferably, as shown, the modules 110 are mounted in proximity to the wall-mounted display 112. Alternatively, the mounting bar 101 may be attached to the legs of a stand or pedestal. Moreover, in other embodiments, the modular mounting bar 101 may also be placed on a pedestal. In another embodiment, the mounting bar 101 may form a pedestal on which a non-wall-mounted display 112 sits. By mounting modules 110 in proximity to the display 112 the length of wiring required between the modules 110 and the display 112 may be advantageously minimized.

Figure 2A:
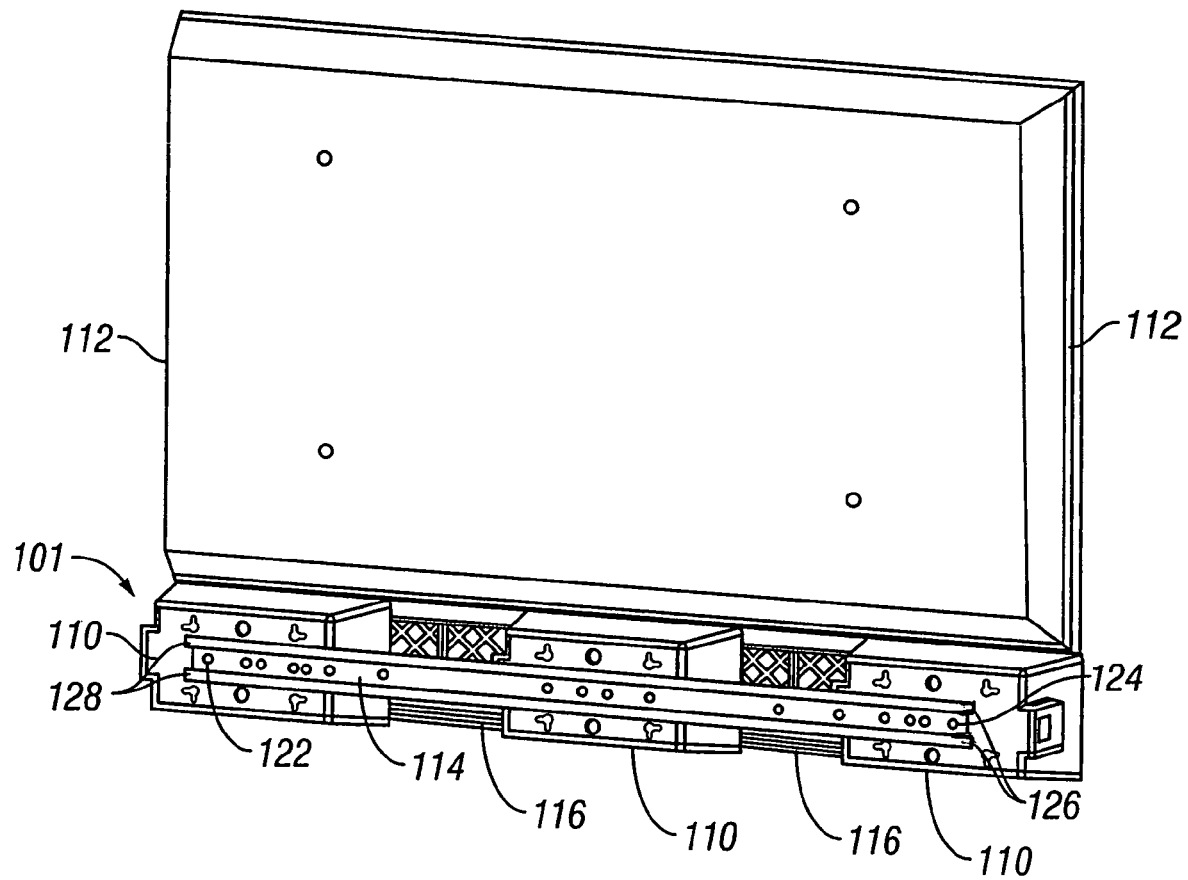
FIG. 2A depicts a rear perspective view of one embodiment of a modular mounting bar of FIG. 1.
Figure 2B:
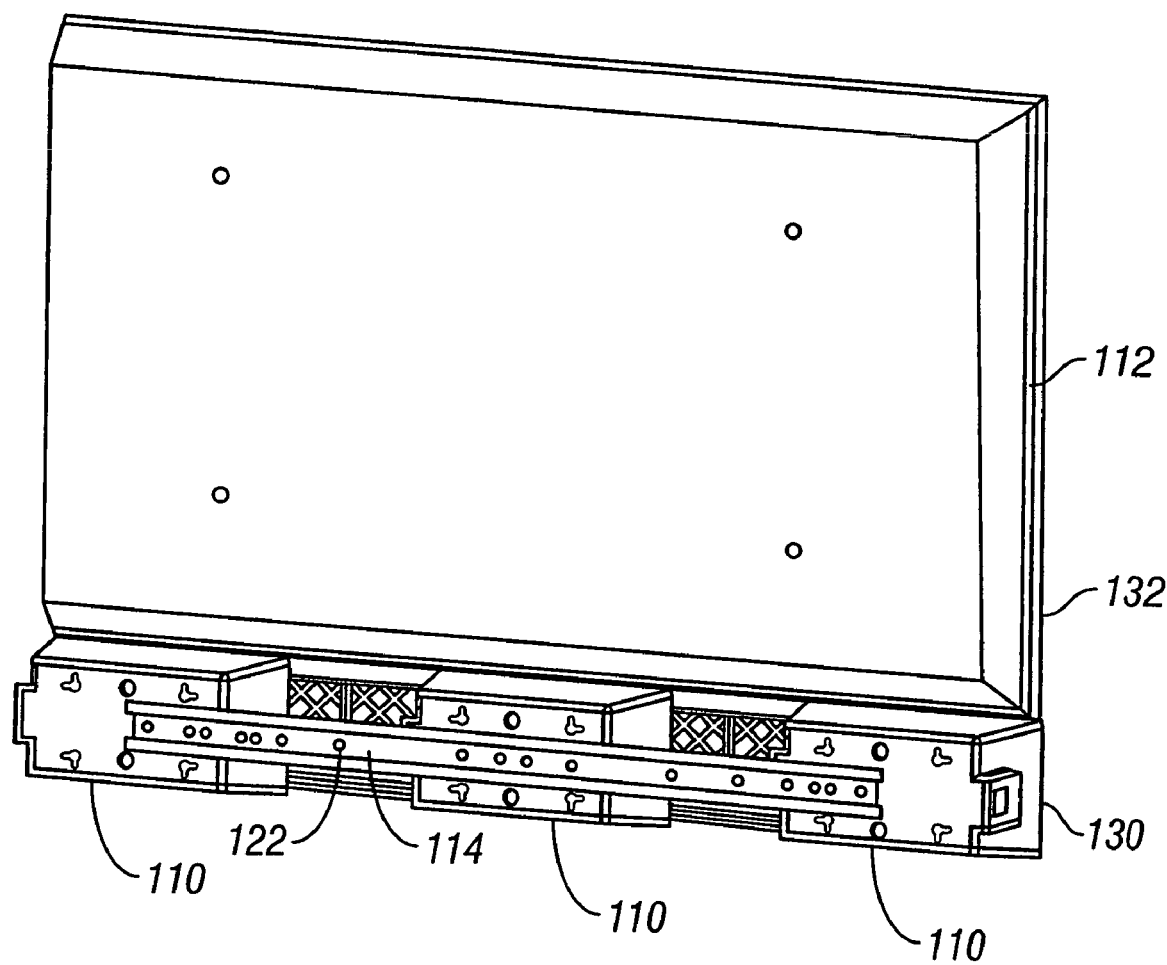
FIG. 2B depicts a rear perspective view of another embodiment similar to that depicted in FIG. 1 mounted in conjunction with a larger display than that of FIG. 1.

As shown from the rear in FIG. 2A, in one embodiment, the mounting bar 101 comprises a rail 114 that is adapted to be affixed to a wall. The rail 114 may have a number of openings 122 to receive a fastener for affixing the rail 114 to a wall. In one embodiment, the rail 114 is affixed to the wall using wood screws passed through openings 122 into a wall stud. It is to be appreciated that the rail 114 may be affixed to a wall using any fastener that is appropriate to the wall construction, including, but not limited to, masonry screws, toggle bolts, drywall screws, bolts, or any other type of fastener or anchor as would be apparent to one of skill in the art.

In another embodiment, hangers, such as are known in the art for hanging pictures or other objects on a wall, are first affixed to the wall using an appropriate fastener. A rail 114 may then be bolted, or otherwise coupled to one or more hangers.

In one embodiment, the rail 114 comprises a substantially planer base 124, which is perforated at selected locations to define fastener openings 122. A pair of flanges 126 extend approximately perpendicularly from each end of the base 124 along opposing longitudinal edges of the base 124. The end of each flange 126 comprises an inwardly directed lip 128. Each flange 126 and lip 128, in combination with the base defines a groove running along the longitudinal edge of the base 124.

When the rail 114 is mounted on a wall, a gap may be formed between the wall and the base 124. In one embodiment, this gap may be configured to allow wires to be routed between modules 110, or to the display 112.

One or more audio-visual modules 110 may be affixed to the rail 114. Preferably, the modules comprise at least two loudspeakers. More preferably, the modules 110 comprise at least three loudspeakers to provide left, center and right channel speakers.

A module 110 may be coupled to the rail 114 by extending a fastener such as a bolt from the module 110 through an opening 122 where the bolt is secured by attachment of a nut thereto. Alternatively, a module 110 may be coupled to the rail 114 by a screw inserted through the rear of the rail 114 into the module 110. In another embodiment, clips may be provided with a channel adapted to fit around the lip 128 of flange 126 so that the clips when coupled to a module 110 are slidable to a selected position along the rail 114 where the clip is fastened to the rail 114 by, for example, a screw. Other embodiments may use fasteners such as, for example, hook and loop patches, or other appropriate fasteners as would be apparent to one of skill in the art. Thus, modules 110 may be easily removed, added, or relocated along the rail 114 as new modules 110 are added. Modules 110 having obsolete or malfunctioning audio-visual components may be removed or replaced. The set of modules 110 may also be repositioned along rail 114 when changes in the set of modules makes rearrangement of the modules 110 advantageous.

Figure 2C:
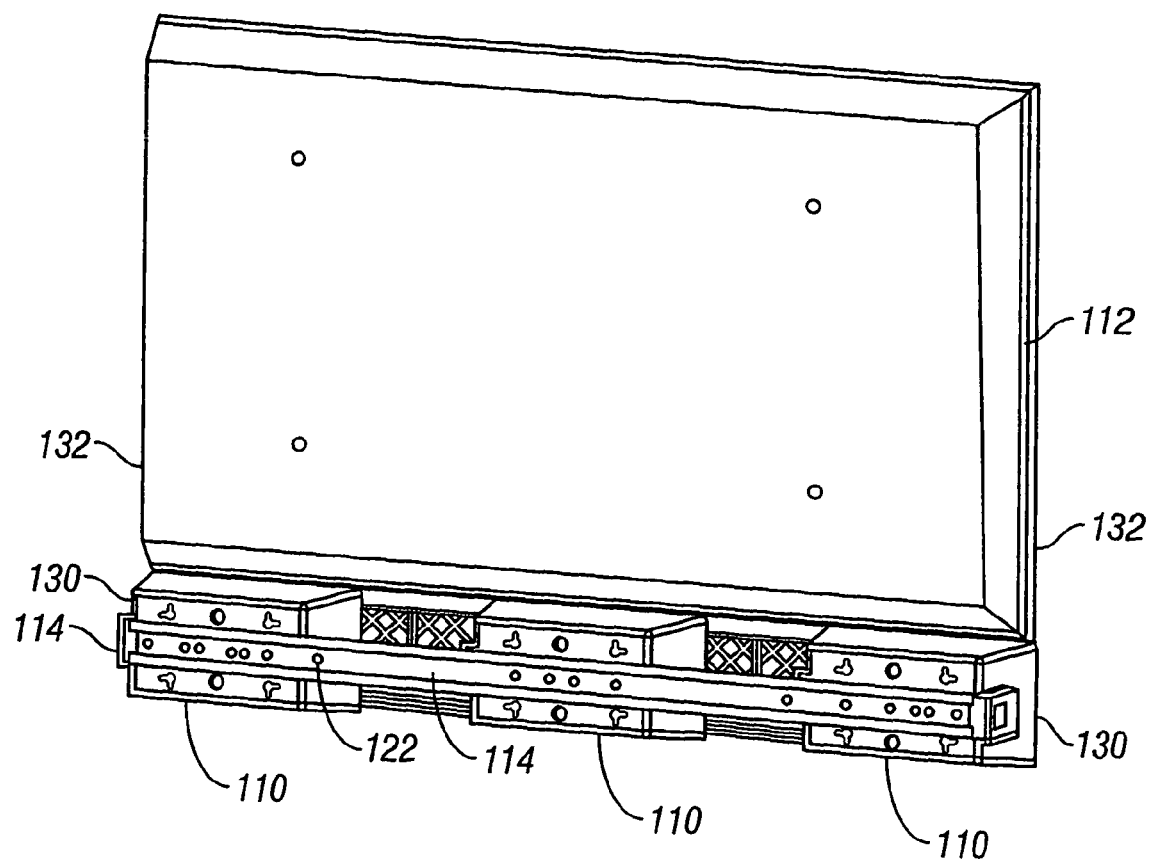
FIG. 2C depicts a rear perspective view of another embodiment similar to that depicted in FIG. 1 mounted in conjunction with a smaller display than that of FIG. 1.

Modules 110 may be mounted along the rail 114 at any desired location corresponding to available coupling points. In particular, modules 110 may be mounted at a distance selected to match the size of the display 112. For example, in the embodiment depicted in FIG. 2B, each module 110, at either end of the rail 114, is attached at a location that is closer to the inner edge of each module 110 than in the embodiment depicted in FIG. 2A. This allows the modules 110 to be placed farther apart than in the embodiment depicted in FIG. 2A so that the outer edges 130 of the modules 110 are approximately aligned with the edges 132 of the display 112. As depicted in FIG. 2C, which illustrates an embodiment where the display 112 is smaller than the embodiment of FIG. 2A, the modules may be attached at a point closer to the outer edges 130 than in FIG. 2A or FIG. 2B to allow the approximate alignment of the edges 130 of the modules 110 to the edges 132 of the display 112.

Figure 3:
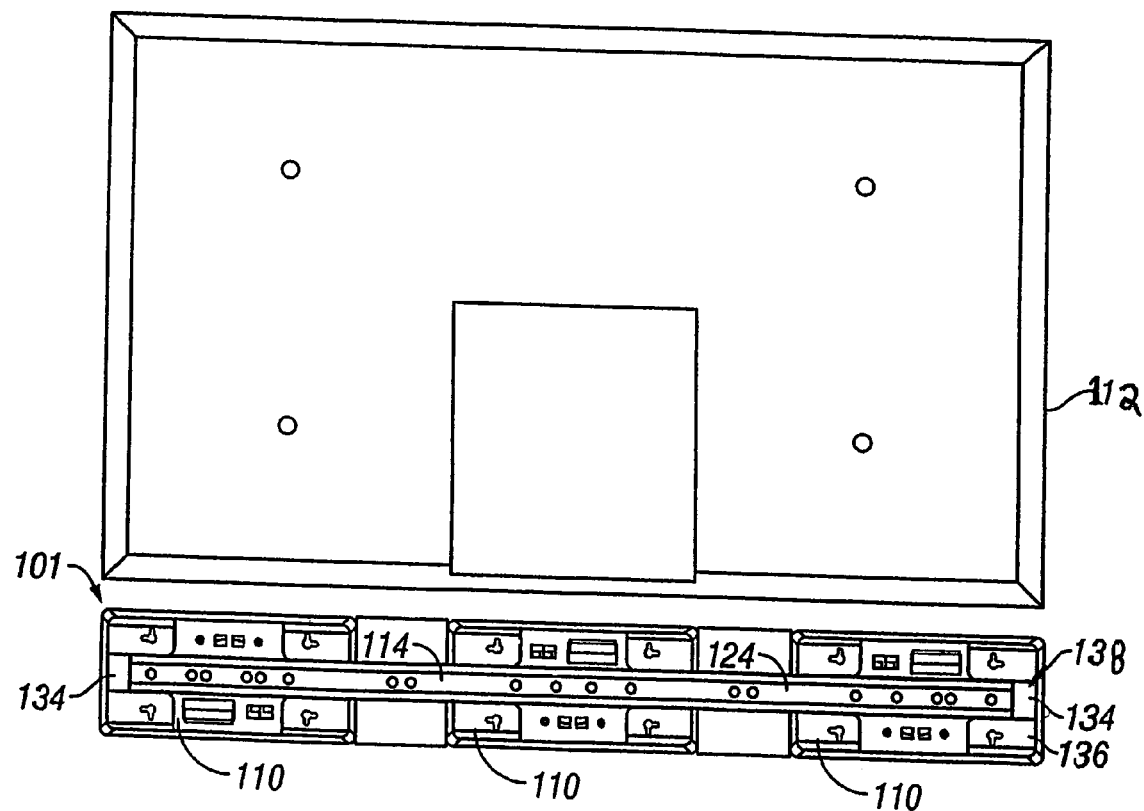
FIG. 3 depicts a rear perspective view of another embodiment of a modular mounting bar, similar to that of FIG. 1.

In another embodiment, depicted in FIG. 3, a portion of the rear surface 136 of each module 110 defines an inset surface 134. One embodiment of a module 110 having an inset surface 134 is also depicted in a side profile view in FIG. 8. Returning to FIG. 3, a set of edges 138 rise from the inset surface 134 to the rear surface 136 to define a channel. The rail 114 may be received into the channel along each of a set of modules 110 to simplify alignment of the modules 110 and to allow a stable coupling of the modules 110 to the rail 114. Preferably, the inset surface 134 between the edges 138 is just wider than the rail 114 so that each flange 124 of the rail 114 fits tightly within the edges 138 of the channel.

Figure 4:
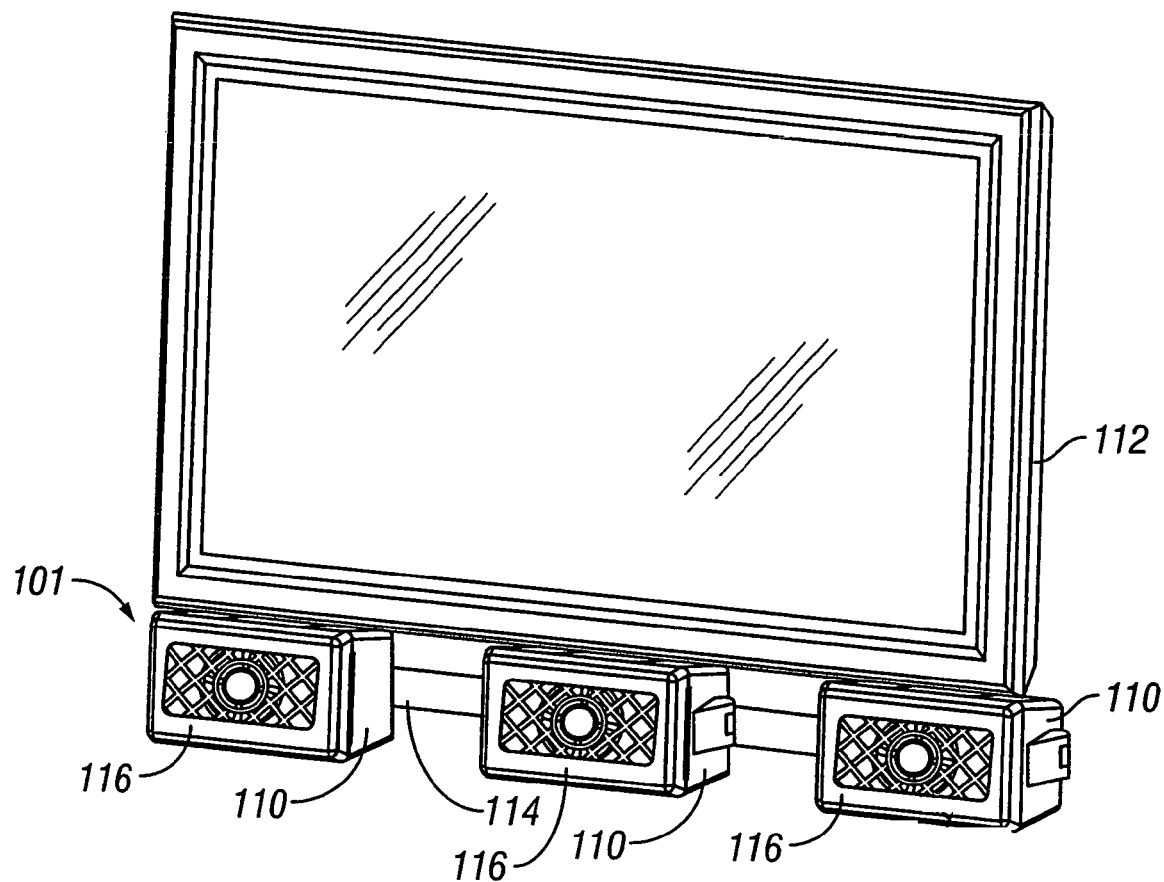
FIG. 4 depicts a front perspective view of an embodiment of a modular mounting bar, similar to the bar depicted in FIG. 3.

In some embodiments, as depicted in FIG. 4, three loudspeaker modules 110 are mounted to the rail 114 with each module 110 having an individual one of the covers 116. Each individual one of the covers 116 may comprise a grille or screen. The mounting bar 101 may also have additional modules attached, for example, a module containing a DVD player 140.

Figure 5:
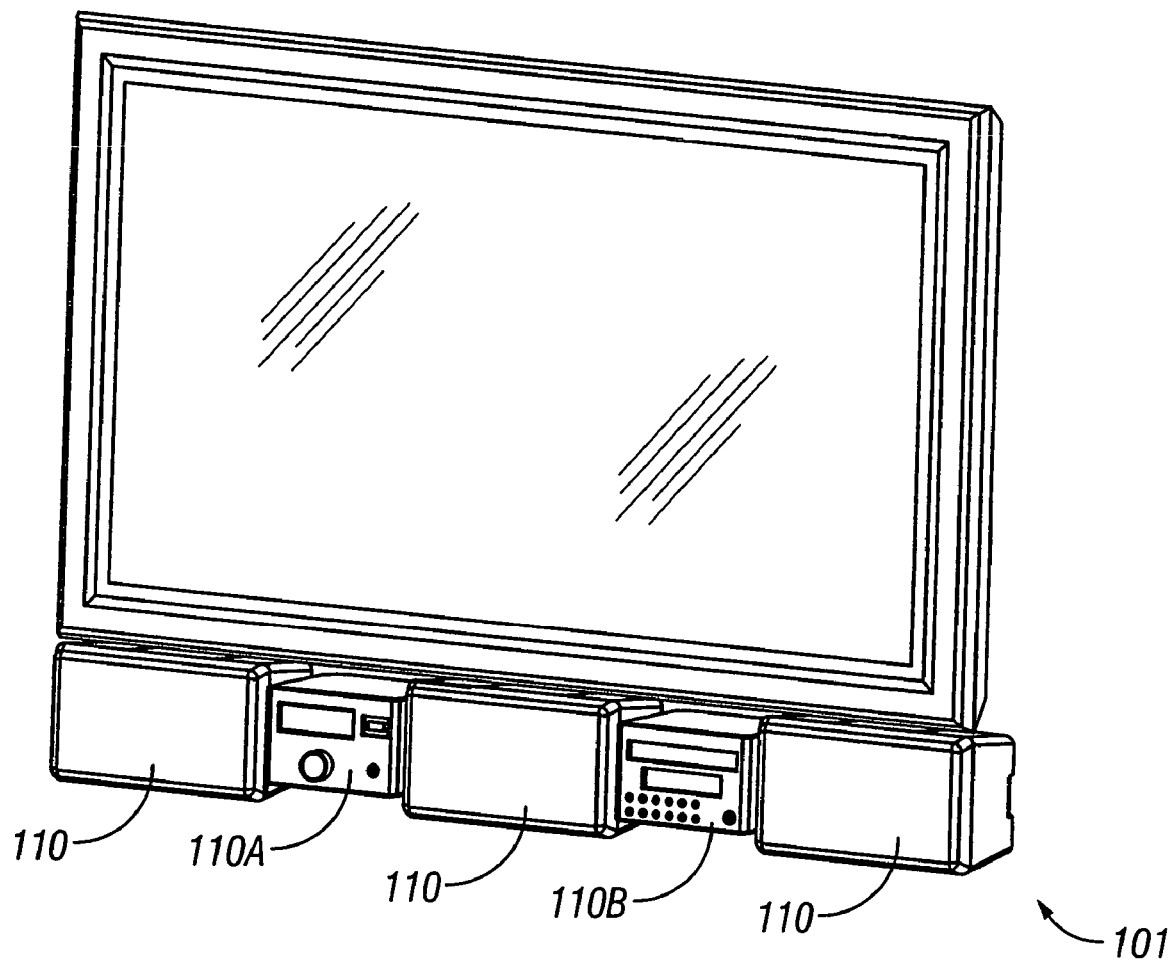
FIG. 5 depicts a front perspective view of an embodiment of a modular mounting bar comprising modules in addition to loudspeakers.
Figure 6:
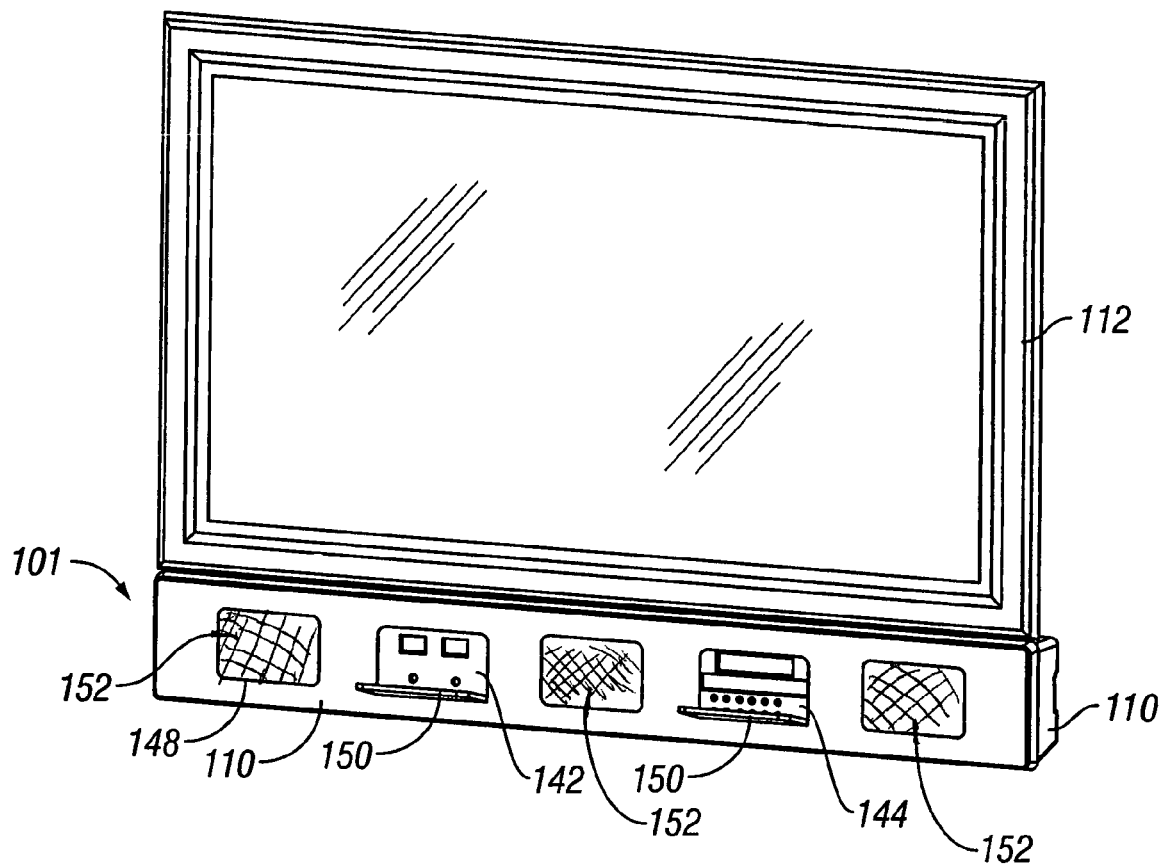
FIG. 6 depicts a front perspective view of an embodiment of the modular mounting bar of FIG. 5 having a cover.

In the embodiment depicted in FIG. 5, for example, in addition to three loudspeaker modules 110, an AM/FM tuner module 110A and a DVD module 110B are mounted to the rail 114. In some embodiments, the same housing may enclose a DVD player and a speaker. It has been found advantageous to include the DVD player in the same housing as the center channel speaker(s). In addition, to enable reduced wire runs, one module 110 may comprise a wireless transmitter. As depicted in FIG. 6, in one embodiment, one module 110 comprises a DVD player 144 and another module comprises a transmitter box 142 for sending an audio-visual signal to components such as amplifiers, wireless receivers, loudspeakers, or video displays.

Each module 110 of the mounting bar 101 may have a standardized height and depth that is sufficient for the module 110 to comprise a wide range of audio-visual components. Preferably, the module depth is selected so that the outer surface of the module is flush with the display surface.

In other embodiments, the modules 110 may comprise a set of components, such as, for example, television tuners, cable "set-top" boxes, infra-red (IR) receivers for the display 112, IR relay devices for relaying IR control signals to a remote device, compact disc (CD) players, digital video recorders, video game machines, video cassette recorders, MP3 audio players, amplifiers, or any other audio-visual component. Further, while in certain depicted embodiments the modules 110 comprise loudspeakers, it is to be appreciated that an embodiment may not include any loudspeaker modules 110.

As noted above, the modular audio-visual mounting bar 101 may include a cover 116 which is secured in front of each of the modules 110. The cover 116 may be affixed to at least one of the modules 110 or to the rail 114.

In one embodiment, the cover 116 may be attached to at least one module 110. In some embodiments, the cover 116 may comprise a rim extending around the top and bottom of the cover to allow the cover 116 to be press fit around the top and bottom of the modules 110.

As depicted in FIG. 6, the cover 116 may comprise an opaque surface. In one embodiment, openings 148 may penetrate the surface of the cover 116 at intervals. One or more modules 110 may be placed behind one or more of these openings 148. While each opening 148 is shown having a module 110 located therein, it is to be appreciated that any number of the openings 148 in a given embodiment of the cover 116 may contain one or more of the modules 110. It is further to be appreciated that in some embodiments having openings 148, some modules 110 may be placed completely behind the solid surface of cover 116.

Figure 7:
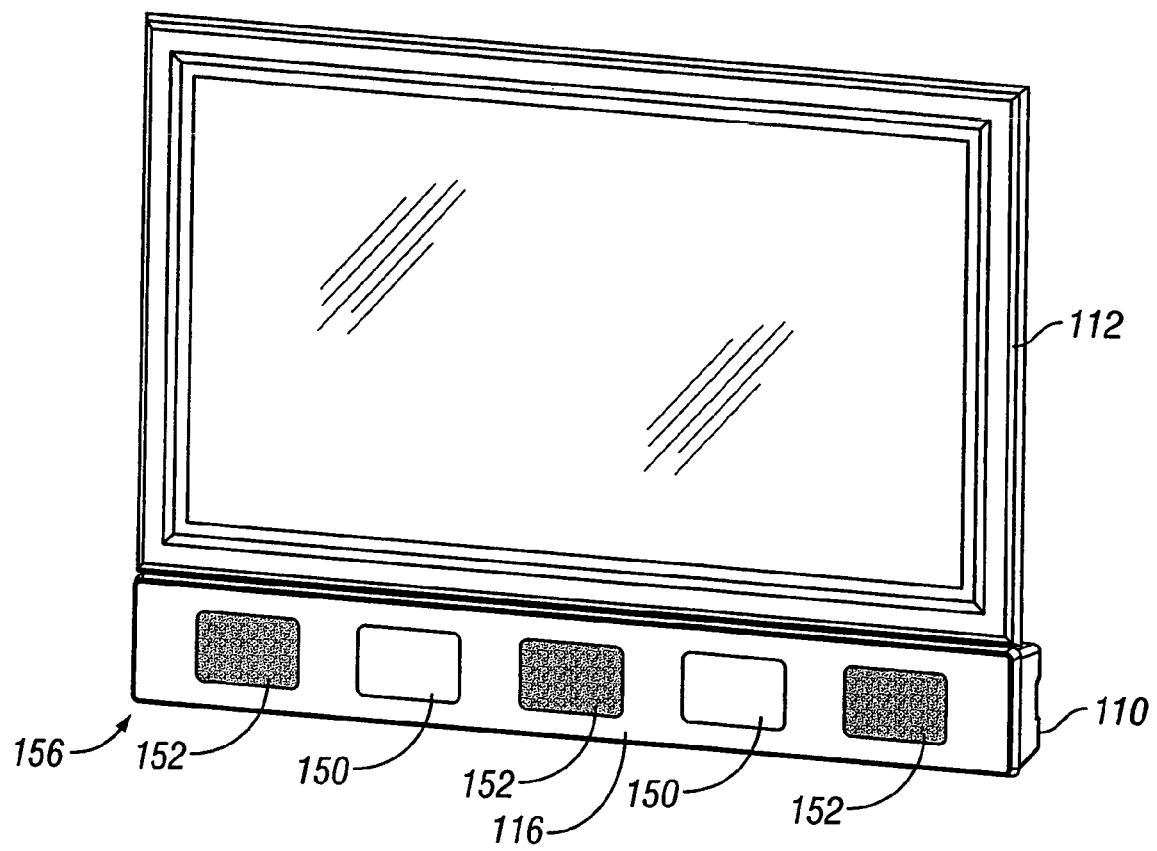
FIG. 7 depicts a front perspective view of the embodiment of the modular mounting bar of FIG. 6.

In one embodiment, solid doors 150 may be placed at each opening 148 to cover each module 110 that is located within. Preferably, the doors 150 may be swung open to expose controls of the module 110. FIG. 7 depicts the embodiment of FIG. 6 with the doors 150 closed to hide the modules 110 that are located within.

Openings 148 may also be covered by a grille or screen 152. Preferably, the loudspeaker module 110 is covered by the screen or grille 152. As depicted in FIG. 1, the cover 116 may comprise a single grille extending across all modules 110. The grille 152 may comprise a set of crossing elements 154 or a fine screen, as is typically used in speaker coverings In some embodiments, electronic components may be combined within a single housing. For example, in the embodiment of FIG. 7, the modules may be combined into a single housing or module 156. The combination module 156 may be mounted onto the rail 114 as with other modules 110. Moreover, in addition to being affixed to the rail 114, the combination module may also be placed on a stand, mounted directly on a wall, or be employed as a stand for a display 112.

Figure 8:
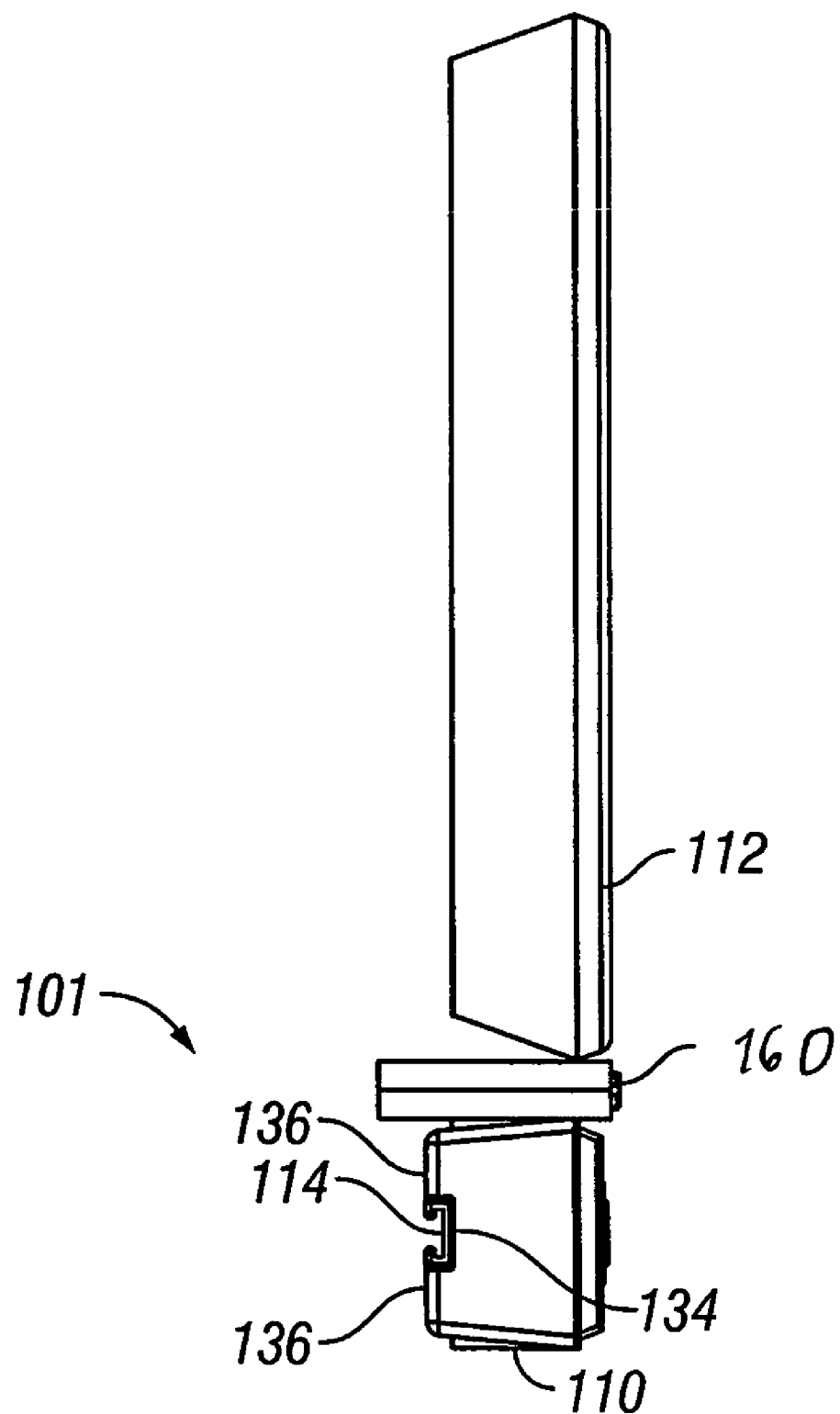
FIG. 8 depicts a side profile view of an embodiment similar to FIG. 3 having an additional audio-visual electronics housing.

As illustrated in FIG. 8, one embodiment of the module mounting bar 101 may also comprise an electronics housing 160. Like a combination module 156, the electronics housing 160 may comprise a frame or housing supporting one or more audiovisual devices, such as are described herein, with respect to the module 110. For example, the embodiment of the electronics housing 160 depicted in FIG. 9A, comprises a DVD player 144 along with additional controls 168 and a display 164. The electronics housing 160 may be coupled to the top of at least one module 110. In one embodiment, the electronics housing 160 is a separate item that may be affixed to one or more modules 110 by a screw, or simply may be mounted on top of the module 110 using connecting means such as patches of hook and loop material.

In another embodiment of the modular mounting bar 101, the center channel speaker module 110 may be integrated with electronics components such as those in the electronics housing 160.

Figure 9:
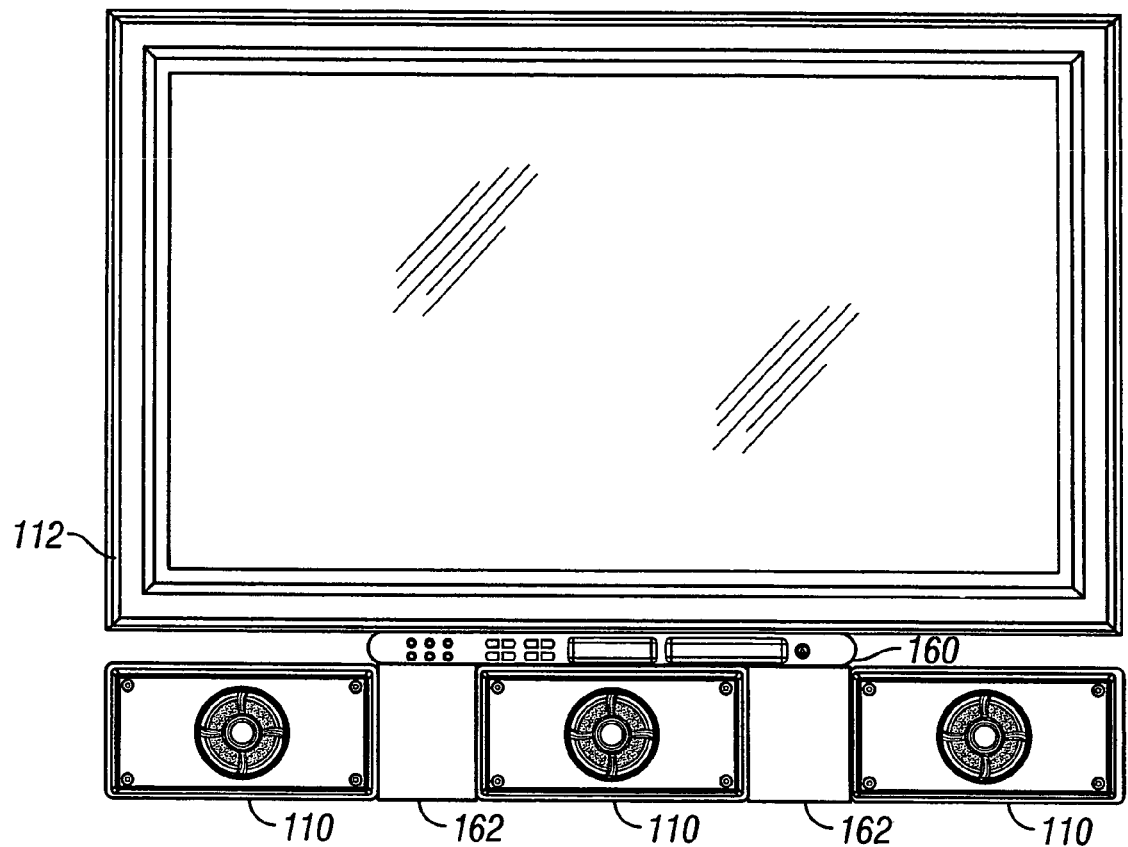
FIG. 9 depicts a front perspective view of another embodiment of a modular mounting bar, similar to the bar depicted in FIG. 8.

In another embodiment, illustrated by FIG. 9, spacers 162 may be coupled to the rail 114. The spacers 162 may couple the electronics housing 160 to the rail 114. Fasteners as described herein for fixing the electronics housing 160 to the module 110 may be used in order to couple the electronics housing 160 to the spacers 162. The spacers 162 are then coupled to the rail 114 as described herein with respect to the attachment of modules 110 to the rail 114. The spacers 162 may comprise an alternative to the cover 116.

In other embodiments, the cover 116 may be attached to one or more spacers 162 by screws, or by press fitting as described above with respect to attachment of the cover 116 to the module 110.

Figure 9A:
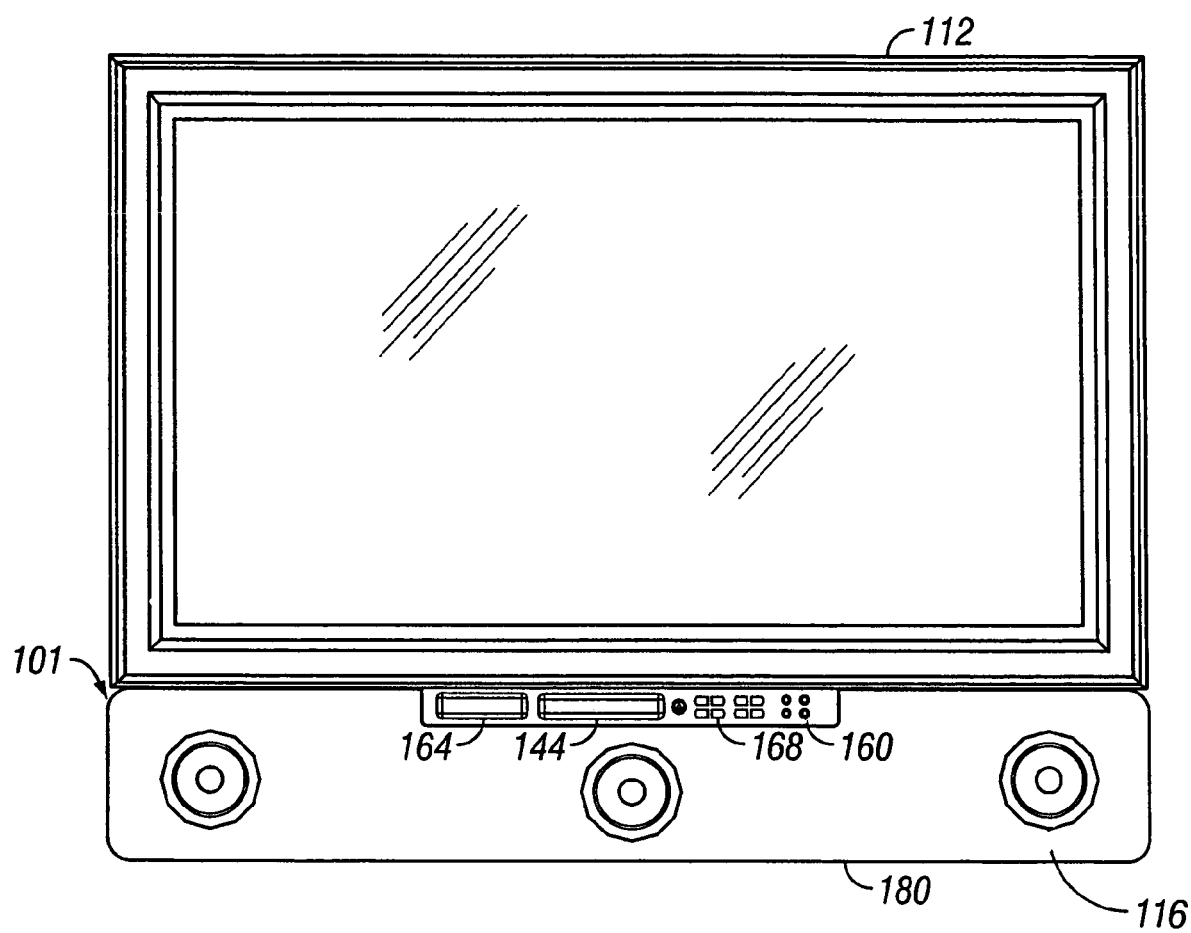
FIG. 9A depicts a front perspective view of an embodiment of a modular mounting enclosure that includes loudspeakers and an additional audio-visual electronics housing, all mounted in a single enclosure.

As illustrated in FIG. 9A, one embodiment of the module mounting bar 101 may comprise an electronics housing module 180 which comprises a single enclosure incorporating a set of electronics components such as the electronics components in the combination module 156 and the electronic components in the electronics housing 160. For example, the electronics housing module 180 may comprise a set of loudspeakers along with additional components, such as a DVD player. The embodiment of the electronics housing module 180 depicted in FIG. 9A, comprises a DVD player 144 along with additional controls 168 and a display 164. Preferably, the depth of the electronics housing module 180 is selected so that the outer surface of the module is flush with the display surface.

Figure 10:
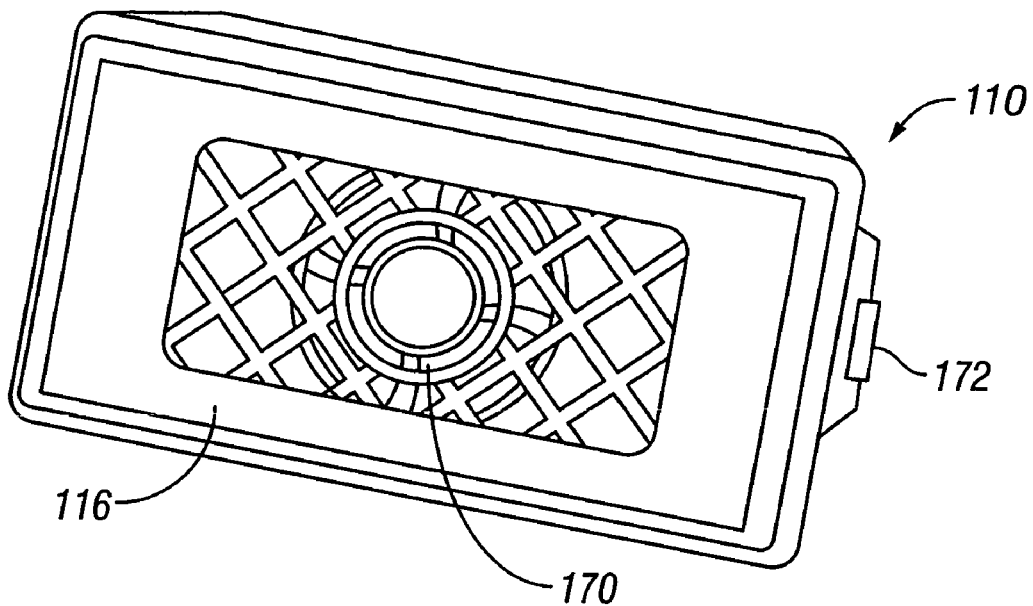
FIG. 10 depicts a front perspective view of one embodiment of a loudspeaker module for use in a modular mounting bar as depicted in FIG. 9.
Figure 11:
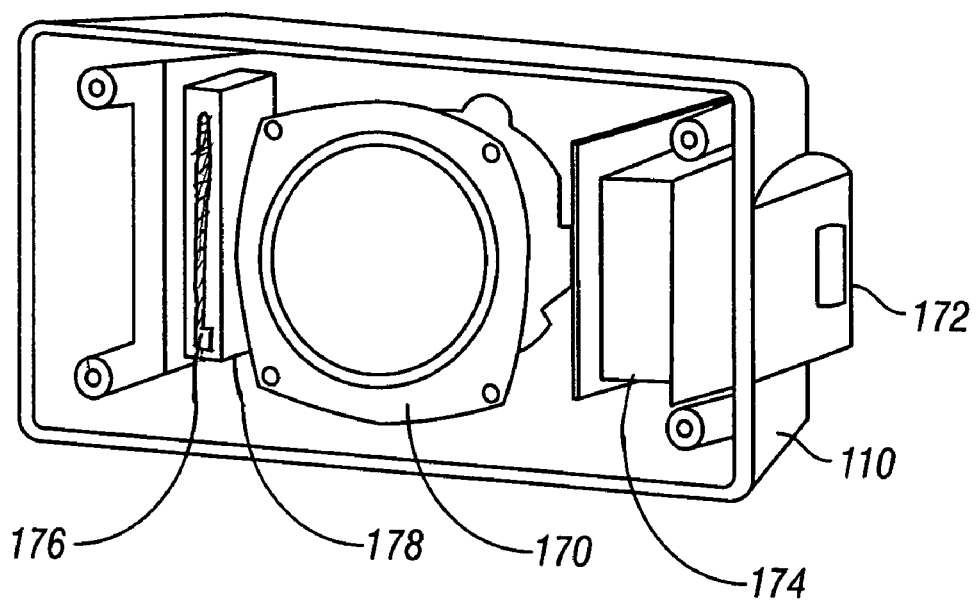
FIG. 11 depicts a front perspective view of one embodiment of a center channel loudspeaker module without a front cover attached that is similar to the embodiment shown in FIG. 10, but which also includes additional signal distribution electronics.

FIG. 10 depicts one embodiment of the loudspeaker module 110. A loudspeaker 170 is disposed within the loudspeaker module 110. Connectors 172 may be provided to connect speaker wires to the loudspeaker 170. FIG. 11 depicts the interior of one embodiment of the module 110. The loudspeaker 170 may be coupled to the frame of the module 110. While in this embodiment, an amplifier 174 is provided within the module 110, other embodiments may comprise a cross-over network or other signal distribution electronics. In addition, to reduce wiring runs, for example, to rear loudspeakers, the loudspeaker module 110 may send a signal through a wireless link. In one embodiment, the end of the wireless link that is connected to the module 110 may include an antenna 176 that is coupled to a wireless transmitter 178. In embodiments comprising a wireless transmitter 178 within a loudspeaker module 110, preferably only one loudspeaker module per system 100 comprises the wireless transmitter 178. In one embodiment, a center channel loudspeaker module 110 may comprise the wireless transmitter 178. In another embodiment, one of the left or right channel loudspeaker modules 110 comprises a wireless transmitter 178.

One embodiment of a mounting bar system 101 also provides an additional option for mounting a video display 112. A center channel loudspeaker module 110 may provide a mounting base or pedestal for the flat panel TV, allowing the consumer to easily achieve optimal placement of center channel directly under display 112 even in locations where the studs or other secure wall supports are not available in the location where the consumer desires to mount the display 112.

The modular nature of the above described system also provides several advantages in product distribution. A significant issue for retailers is limiting the number of different high cost items that are stocked. Each item stocked by a retailer is typically identified as a stock keeping unit (SKU). For example, a non-modular system might be utilized that includes a housing, speakers, mounts, a cover, and/or other items in a pre-assembled configuration that is fixed as a single non-modifiable unit to a wall. To make different enclosure widths and cover options available to consumers at a retail location, a retailer would be required to stock a large number of different and expensive non-modular speaker enclosures of varying widths and with different covers. It is very expensive for the retailer to stock a large number of high cost speaker SKUs to allow consumers a choice of different loudspeaker systems. However, by offering a modular system 101, the retailer may advantageously offer multiple grille and mounting bar SKUs to support a myriad of flat panel dimensions and consumer style tastes. Thus a retailer may, for example, stock one SKU that contains a three speaker package that is designed to be advantageously matched with LCD video displays when mounted to the above described rail apparatus. At the same time, the retailer can offer separate grille and rail kits to support a variety of display 112 dimensions. These kits are inexpensive because they do not include speakers or other electronics, and thus, stocking a large number of rail and grille SKUs is not cost prohibitive for the retailer. A retailer may thus offer a product that is customized for each customers needs, while controlling inventory costs by minimizing the number of high cost SKUs.

In view of the above, it will be appreciated that embodiments of the invention overcome many of the longstanding problems in the art by providing a rail which allows a variety of audio-visual components to be conveniently mounted and repositioned at a variety of positions on a wall or surface in proximity to a wall mounted display without consuming any floor space. In addition, the mounting bar provides a rail which allows audio-visual components and the wall mounted display to be mounted in close proximity to each other to reduce inter-component cable runs.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A modular mounting bar for securing components for use with a display device comprising a housing to a surface separate from the display device, comprising: a plurality of audio-visual modules; a rail configured to be attached to the surface via at least one of a plurality of openings disposed along the rail and the rail being configured to receive each of the modules at a respective one of a plurality of module mounting locations along the rail, wherein the modules are positioned above or below the display device and within the vertical bounds of the display device, wherein the rail is not coupled to either the display device or the housing of the display device, and wherein the surface comprises the outer surface of a generally vertical wall, and wherein there are more module mounting locations than audio-visual modules; and a cover configured to be secured in front of at least a portion of one of the modules.

2. A modular mounting system for audio-visual components for use with a display device comprising a housing, comprising: a plurality of audio-visual modules; and a rail wherein the rail is configured to be attached to a surface other than surfaces of the display device, wherein the surface comprises the outer surface of a generally vertical wall, wherein the rail is separate from the display device and the housing of the display device, and wherein the rail is configured to receive each of the modules at respective one of a plurality of module mounting locations along the rail, wherein the module is positioned above or below the display device and within the vertical bounds of the display device, and wherein there are more module mounting locations than audio-visual modules.

3. The modular mounting system of claim 2, further comprising:
a cover that is configured to be securely positioned in front of the module.

4. The modular mounting system of claim 3, wherein the cover is configured to be secured to the at least one module.

5. The modular mounting system of claim 3, wherein the cover comprises a grille.

6. The modular mounting system of claim 2, wherein the rail comprises a plurality of openings configured to receive a fastener, the fastener being securable to the surface.

7. The modular mounting system of claim 2, wherein the rail comprises:
a base configured to define a mating relationship with the at least one module;
a pair of flanges that defines a groove running along the lengthwise edge of the base.

8. The modular mounting system of claim 7, wherein the pair of flanges each extend approximately perpendicularly from each end of the base and along opposing longitudinal edges of the base, each flange having a portion comprising an inwardly extending lip.

9. The modular mounting system of claim 2, wherein the at least one audio-visual module comprises a loudspeaker.

10. The modular mounting system of claim 2, wherein the at least one audio-visual module comprises a DVD player.

11. The modular mounting system of claim 2, wherein the at least one audio-visual module comprises an amplifier.

12. The modular mounting system of claim 2, wherein the at least one audio-visual module comprises a television tuner.

13. The modular mounting system of claim 2, wherein the at least one audio-visual module comprises an audio-visual controller.

14. The modular mounting system of claim 2, wherein the at least one audio-visual module comprises a wireless transmitter.

15. The modular mounting system of claim 2, wherein the at least one audio-visual module comprises a wireless receiver.

16. The modular mounting system of claim 2, wherein the at least one audio-visual module comprises a compact disc player.

17. The modular mounting system of claim 2, wherein the at least one audio-visual module comprises a digital video recorder.

18. The modular mounting system of claim 2, wherein the at least one audio-visual module comprises an MP3 player.

19. The modular mounting system of claim 2, wherein the at least one audio-visual module comprises a central processing unit (CPU).

20. The modular mounting system of claim 2, wherein the at least one audio-visual module comprises a media center.

21. The modular mounting system of claim 2, wherein the at least one audio-visual module comprises an audio-visual signal distribution system.

22. A method of mounting audio-visual components for use with a display device comprising a housing, to a surface separate from the display device, comprising: securing a rail to the surface, the surface comprising the outer surface of a generally vertical wall; and connecting a plurality of audio-visual components to the rail, wherein the audio-visual components are positioned above or below the display device and within the vertical bounds of the display device, wherein the rail is configured to receive each one of the audio-visual components at a respective one of a plurality of component mounting locations along the rail, and wherein there are more component mounting locations than audio-visual components.

23. The method of claim 22, wherein the rail has portions thereof that define a channel; and
wherein the audio-visual component has attachment surfaces that matingly connect with the channel to the rail, so as to fix the component in a desired location on the rail.

24. The method of claim 23, further comprising:
securing a cover to the component so as to secure the cover in a desired location on the component.

25. The method of claim 22, further comprising connecting at least one additional audio-visual component to the rail.

26. An assembly for mounting audio-visual components for
use with a wall-mounted display device comprising a housing, the assembly comprising: at least two audio-visual modules comprising loudspeakers; a rail wherein the rail is configured to only be attached to a surface other than surfaces of the display device and the housing of the display device, the surface comprising the outer surface of a generally vertical wall, and wherein the rail is configured to receive each one of the modules at respective one of a plurality of module mounting locations, wherein the audio-visual modules are positioned above or below the display device and within the vertical bounds of the display device, and wherein there are more module mounting locations than audio-visual modules; and a cover having a dimension approximately equal to a length of the display device and defining a mating relationship with the at least two modules.

27. The assembly of claim 26, wherein the cover is configured to be coupled to the modules.

28. The assembly of claim 26, wherein the cover is configured to be coupled to the rail.

29. The assembly of claim 26, wherein the cover comprises a grille.

30. The assembly of claim 26, further comprising a third module comprising a loudspeaker.

31. The assembly of claim 26, further comprising a module comprising an amplifier.

32. The assembly of claim 26, further comprising a module comprising one end of a wireless link.

33. A modular mounting bar for securing components in proximity to a display device having a width, the display device being secured to a generally vertical wall, comprising: a rail having mounting locations for plurality of audio-visual components and configured to be secured to an outer surface of the generally vertical wall independent from the display device, and wherein there are more mounting locations than audio-visual components; an means for connecting delete each one of the audio-visual component to respective one of the multiple mounting locations on the rail so that component locations match the width of the display device, wherein the component is positioned above or below the display device and within the vertical bounds of the display device.

34. The module mounting bar of claim 33, further comprising means for connecting at least one additional audio-visual component to the rail.

35. A modular mounting bar for securing components in proximity to a display device having a width, the display device being secured to a generally vertical wall, comprising:
a plurality of audio-visual-modules;
a rail configured to be secured to an outer surface of the generally vertical wall independent from the display device and having a length no greater than the width of the display device, wherein the length of the rail is greater than the width of each of the modules, wherein the rail has a plurality of mounting holes at each of a plurality of module mounting locations to match module mounting to the width of the display device, and wherein each of the modules is configured to be attached to the rail at a respective one of the module mounting locations, wherein the modules are positioned above or below the display device and within the vertical bounds of the display device, and wherein there are more module mounting locations than audio-visual modules; and a cover having a length substantially the same as the width of the display device.

36. The modular mounting bar of claim 35, wherein at least one of the audio-visual modules comprises a loudspeaker.

37. The modular mounting bar of claim 35, wherein at least one of the audio-visual modules comprises a DVD player.

38. The modular mounting bar of claim 35, wherein at least one of the audio-visual modules comprises an amplifier.

39. The modular mounting bar of claim 35, wherein at least one of the audio-visual modules comprises a television tuner.

40. The modular mounting bar of claim 35, wherein at least one of the audio-visual modules comprises an audio-visual controller.

41. The modular mounting bar of claim 35, wherein at least one of the audio-visual modules comprises a wireless transmitter.

42. The modular mounting bar of claim 35, wherein at least one of the audio-visual modules comprises a wireless receiver.

43. The modular mounting bar of claim 35, wherein at least one of the audio-visual modules comprises a compact disc player.

44. The modular mounting bar of claim 35, wherein at least one of the audio-visual modules comprises a digital video recorder.

45. The modular mounting bar of claim 35, wherein at least one of the audio-visual modules comprises an MP3 player.

46. The modular mounting bar of claim 35, wherein at least one of the audio-visual modules comprises a central processing unit (CPU).

47. The modular mounting bar of claim 35, wherein at least one of the audio-visual modules comprises a media center.

48. The modular mounting bar of claim 35, wherein at least one of the audio-visual modules an audio-visual signal distribution system.

* * * * *

UNITED STATES PATENT AND TRADEMARK OFFICE
CERTIFICATE OF CORRECTION

| | | |
|---|---|---|
| PATENT NO. | : 8,270,651 B2 | Page 1 of 1 |
| APPLICATION NO. | : 10/786576 | |
| DATED | : September 18, 2012 | |
| INVENTOR(S) | : William A. McCarty et al. | |

It is certified that error appears in the above-identified patent and that said Letters Patent is hereby corrected as shown below:

In the Claims:

In Column 10, Claim 33, Line 53, delete "connecting delete" and insert --connecting--, therefor.

Signed and Sealed this
Twenty-eighth Day of May, 2013

Teresa Stanek Rea
*Acting Director of the United States Patent and Trademark Office*